Feb. 24, 1970 — H. H. HORAK — 3,497,164

VIBRATION ISOLATOR

Filed March 15, 1968

INVENTOR
HOBBS H. HORAK

BY *Thomas O. Watson Jr.*, ATTORNEY

United States Patent Office 3,497,164
Patented Feb. 24, 1970

3,497,164
VIBRATION ISOLATOR
Hobbs H. Horak, 1623 Tucker Road,
Oxon Hill, Md. 20022
Filed Mar. 15, 1968, Ser. No. 713,548
Int. Cl. B64c 27/00
U.S. Cl. 244—17.27            7 Claims

ABSTRACT OF THE DISCLOSURE

A low frequency, hydropneumatic, vibration isolator having a pair of fluid cylinders coaxially arranged with the pistons mounted on a common piston rod. A load bearing bellows radially engaging the rotor shaft of the helicopter is connected to one of the cylinders and the chamber defined thereby is filled with hydraulic fluid for applying the load on the piston to the bellows. The other cylinder is connected to the outlet of the compressor of a helicopter engine to apply compressor outlet pressure to the other piston and hence to the bellows and rotor shaft. Changes in load on the bellows due to rotor shaft vibration will be compensated for by the force applied to the bellows to damp out the vibration.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to vibration isolators and more particularly to isolators capable of isolating vibrations of relatively large deflection and low frequency.

In the field of helicopter design, one of the most formidable problems confronting the designer is that of minimizing the effects of vibration produced by rotor imbalance. In the past, this problem has been dealt with principally by careful design and manufacture of the rotor components and by the use of vibration isolators of the type wherein a movable mass and spring absorb the imbalance force. However, anyone who has ridden in a helicopter will readily appreciate that this approach leaves a lot to be desired.

An unbalanced helicopter rotor revolving at 200 r.p.m. (the usual maximum) will produce a vibration having a frequency of only 3.33 c.p.s. Since vibration isolation is possible only in the frequency range $\omega/\omega_{11} > \sqrt{2}$, a suspension system employing conventional springs would have to have an impossibly large statical deflection to cope with this frequency. For example, to reduce by 80% a disturbance of 1.0 c.p.s. would require a system of natural frequency 0.408 c.p.s. with a statical deflection of 4.8 ft. Manifestly, practical difficulties of considerable magnitude would be encountered in attempting to design a suspension with conventional springs to deal with disturbances in the frequency range 0–3.33 c.p.s. Thus the spring type of vibration isolator is completely unsuitable for isolating vibrations produced by imbalance in a helicopter rotor.

The air spring is another type of prior art vibration isolator and is one which is capable of successfully isolating vibration in the aforementioned frequency range since the air spring enables a system to have a very low natural frequency with zero statical deflection. Basically, an air spring utilizes the displacement of the virbrating object to compress an entrapped volume of air in a buffer chamber and thereby produce a reaction to the disturbance which serves to isolate the vibration. A very soft spring, i.e., one with low stiffness and a very low natural frequency, may be made by increasing the volume of entrapped air. A more complete discussion of the theory and design of air springs can be found on pp. 67 and 68 of "Vibration Theory and Applications" by Wm. T. Thompson, (Prentice-Hall, Inc., 1965). Air springs are in common use on large, heavy machinery and require the use of a large storage tank to provide sufficient volume in the buffer chamber. As such, they are hardly adaptable for aircraft or other uses where weight and space are dominating design criteria.

SUMMARY OF THE INVENTION

The general purpose of this invention is to provide a new and improved air spring system which possesses all the advantages of similarly employed air spring systems and yet is free from the need for a large storage tank which heretofore preclude their use in aircraft. To attain this end, the present invention provides an air spring system in which the storage tank is replaced by a connection to a steady flow process. Such steady flow process may be the air flow in a jet engine aircraft, steam flow in a ship, and inlet manifold vacuum in a gasoline engine vehicle. The steady flow process approximates an infinitely large tank.

OBJECTS OF THE INVENTION

It is a primary object of this invention to provide a new and improved vibration isolator.

It is another object of this invention to provide a compact vibration isolator capable of isolating very low frequency vibrations.

It is a further object of this invention to provide an unusally small vibration isolator of the air spring type which will isolate the low frequency vibrations of helicopter rotors.

BRIEF DESCRIPTION OF THE DRAWING

Other objects, advantages and novel features of the invention will become readily apparent upon consideration of the following detailed description when read in conjunction with the accompanying drawing, in which like numerals of reference designate like parts throughout the several views, and wherein.

DESCRIPTION OF THE PREFERRED EMBODIMENT

Figure 1:
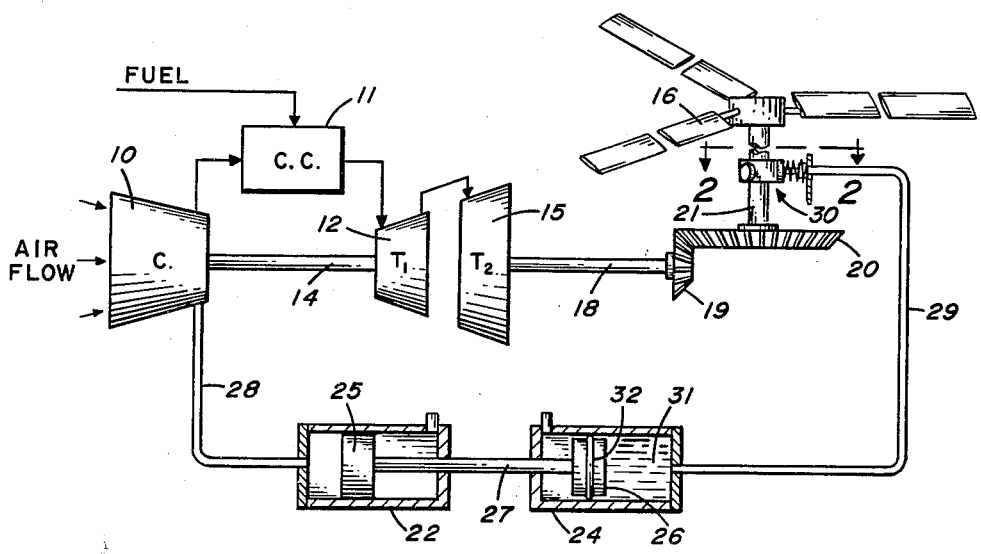
FIGURE 1 is a schematic representation of the vibration isolator of the present invention associated with the power plant of a jet engine helicopter.

Attention now is directed to the drawing, and more particularly to FIG. 1, wherein is disclosed a conventional jet engine power plant for a helicopter. The power plant comprises a compressor 10, a combustion chamber 11 having an associated fuel feed, a compressor drive turbine 12 and a shaft 14 coupling the compressor and turbine. These elements are known collectively as the gas generator. A power turbine 15, which receives the hot, partially expanded gases from the drive turbine 12, is provided to drive a rotor 16. The turbine 15 is coupled to the rotor 16 by means of a power turbine shaft 18, a transmission represented by bevel gears 19 and 20, and a rotor shaft 21 in which the rotor 16 is mounted. Since the aforedescribed structure and its mode of operation are conventional and hence well understood in the helicopter art, no further description of the helicopter power plant is deemed necessary.

The vibration isolator of the present invention comprises a pair of coaxially-arranged, fluid cylinders 22 and 24, containing pistons 25 and 26, respectively, and a common piston rod 27 connected to both pistons. The cylinder 22 is coupled to the output stage of the compressor 10 by means of a line 28 whereby the output pressure of the compressor may be applied to the piston 25. The piston 25 is a loose sliding fit in cylinder 22. While this will allow a small quantity of air to leak around the piston 25, this is tolerated because frictional forces will be minimized without any appreciable adverse effect on the compressor operation.

A fluid line 29 connects the cylinder 24 to a load bearing bellows, designated generally by the reference numeral 30, mounted on the helicopter frame. The cylinder 24, line 29 and bellows 30 are filled with a liquid 31, such as hydraulic fluid or the like and the piston 26 is provided with an O-ring seal 32 to prevent the liquid 31 from leaking past the piston 26. A complete helicopter installation would include three isolators with the load bearing bellows 30 spaced at 120° intervals around the rotor shaft 21. However, only one is being described for purposes of simplicity.

Figure 2:
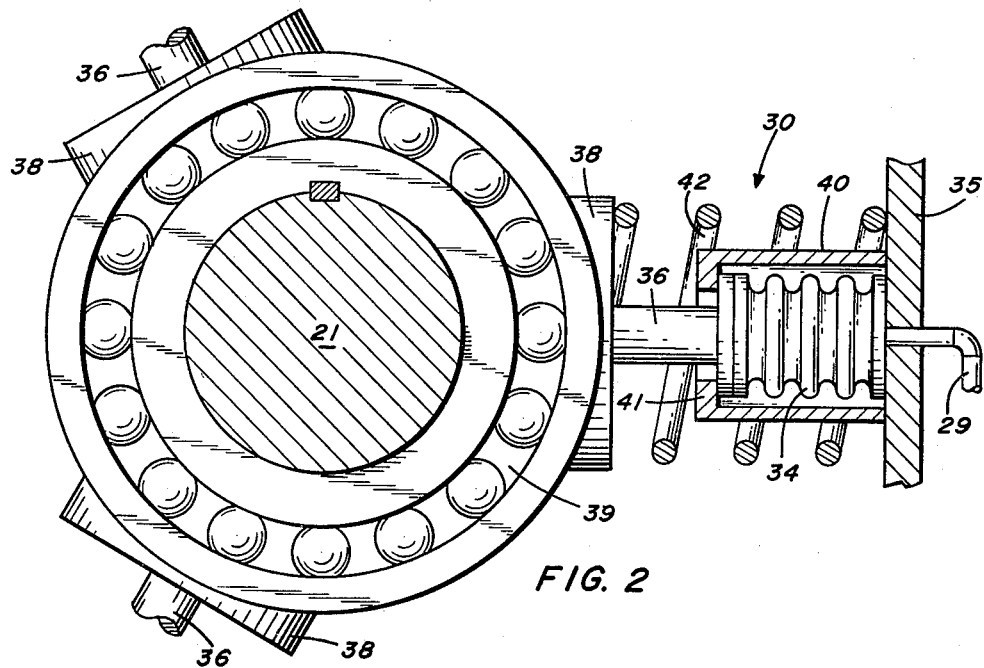
FIGURE 2 is a sectional view taken along the line 2—2 of FIG. 1 and illustrating in detail the load bearing members of the vibration isolator.

Referring now to FIG. 2, it can be seen that the load bearing device 30 (only one shown completely) comprises a bellows 34 mounted on a frame member 35 of the helicopter air frame. The bellows 34 is secured at one end to the member 35 in fluid tight relationship and is in fluid communication with the line 29 which projects through the member 35. The other end of the bellows is closed and has a push rod 36 mounted coaxially thereon. A reaction plate 38 is fixed on the outer race of a ball bearing 39; the inner race of which is keyed to the rotor shaft 21. A sleeve 40 is mounted on the frame member 35 over the bellows 34 and is provided with a radially inwardly projecting flange 41 which engages the free end of the bellows and serves to limit expansion thereof to hold the push rod 36 just clear of the reaction plate 38 when the rotor shaft 21 is properly centered. A compression spring 42 is interposed between the member 35 and plate 38 for centering the shaft 21 whenever the engine is not running.

OPERATION

In order that a better understanding of the invention might be had, its mode of operation will now be described.

When the helicopter engine is running at rater speed, a force will be exerted on the piston 25 equal to the pressure in cylinder 22 multiplied by the area of the piston face. This force will be exerted on the free end of the bellows 34, through the piston rod 27, piston 26 and liquid 31, and will tend to hold the free end of the bellows against the flange 41. If the rotor shaft 21 begins to oscillate due to rotor imbalance, for example, to the right as viewed in FIG. 2, the reaction plate 38 will engage the push rod 36 and lift the free end of the bellows 34 off the flange 41. Any movement of the shaft other than axially of one of the bellows will bring two of them into play in a similar manner. The force which had held the bellows against the flange then opposes further movement of the shaft and tends to return the shaft to its center position. Because air leakage is allowed around piston 25 and since the line 29 receives only a portion of the compressor output, movement of the pistons to the left, as viewed in FIG. 1, will not appreciable change the air pressure in cylinder 22. Therefore, the restoring force exerted by the bellows 34 through the push rod 36 is independent of bellows displacement and thus the vibration isolator of the present invention approximates an air spring with an infinitely large storage tank. This renders the present invention ideal for coping with low frequency disturbances since an air spring whose air storage approaches infinity has a natural frequency which approaches zero.

The total restoring force will be dependent to some slight extent upon displacement due to the presence of the compression springs 42. However, the spring constant of these springs is selected so that they provide only a minor portion of the restoring force since their primary function is to center the shaft when the engine is not running and to assist the bellows during start up and shut down when the engine is not running at rated speed. Additionally, the displacements of the rotor shaft will be relatively small and thus any slight variation in restoring force may be neglected.

CONCLUSION

In conclusion, it is believed that it has been made clear that the present invention possesses numerous advantages not found in prior art devices. Principal among these is the capability of isolating low frequency vibrations by means of an air spring arrangement while simultaneously eliminating the large storage tank customarily found in conventional air springs.

Obviously many modifications and variations of the present invention, as illustrated by the foregoing description of the preferred embodiment, are possible in the light of the above teachings. For example, a bellows or diaphragm could be used in place of the cylinder 24 and a cylinder and piston could be used in place of the bellows 34. Also, damping could be introduced by the use of restricted orifices in the line 29. It is therefore to be understood that the invention may be practiced otherwise than as specifically described.

What is claimed is:

1. A low frequency, vibration isolator for use with a structure having a vibrating member comprising:
   means providing continuous flow of a gas at a pressure other than atmospheric,
   means adapted to engage the vibrating member for opposing movement thereof; and
   means interconnecting said continuous flow means and said opposing means for applying the pressure of said gas to said opposing means whereby a constant force will be provided to oppose movement of the vibrating member.

2. A vibration isolator as defined in claim 1 wherein said continuous flow means provides gas flow at a pressure less than atmospheric.

3. A vibration isolator as defined in claim 1 wherein said continuous flow means provides gas flow at a pressure greater than atmospheric.

4. A vibration isolator as defined in claim 1 wherein said opposing means comprises a fluid filled expansible device.

5. A vibration isolator as defined in claim 4 wherein said fluid filled expansible device comprises an expansible bellows filled with hydraulic fluid.

6. A vibration isolator as defined in claim 1 wherein said interconnecting means comprises a pair of axially aligned fluid cylinders having the pistons thereof mounted on a common piston rod.

7. A low frequency, vibration isolator for isolating vibrations of the rotor shaft of a jet engine helicopter comprising:
   a pair of axially aligned fluid cylinders fixed to the airframe of the helicopter and having the pistons thereof mounted on a common piston rod;
   an expansible bellows device mounted on the helicopter airframe and having the free end thereof engaging the rotor shaft;
   first conduit means interconnecting said bellows device and the working end of one of said cylinders;
   hydraulic fluid filling said bellows device, said one cylinder, and said first conduit means; and
   second conduit means interconnecting the other of said cylinders and the outlet of the compressor of the helicopter jet engine whereby compressor outlet pressure will be applied to said bellows device through said cylinders applying a force to the free end of said bellows device for opposing movement of the rotor shaft.

References Cited

UNITED STATES PATENTS

| | | | |
|---|---|---|---|
| 2,949,254 | 8/1960 | Bauer | 244—17.27 |
| 3,100,610 | 8/1963 | Armstrong | 244—17.25 |
| 3,385,131 | 5/1968 | Hall et al. | 74—574 |

MILTON BUCHLER, Primary Examiner

P. E. SAUBERER, Assistant Examiner

U.S. Cl. X.R.

74—5.5, 574; 170—159; 188—1; 248—358; 267—1